(12) United States Patent
Munukutla et al.

(10) Patent No.: US 12,713,421 B2
(45) Date of Patent: Aug. 18, 2026

(54) SYSTEMS, METHODS, AND DEVICES FOR WIRELESS DEVICE COEXISTENCE ENHANCEMENT USING ACTIVITY OVERLAP

(71) Applicant: Cyperss Semiconductor Corporation, San Jose, CA (US)

(72) Inventors: Sandeep Sarma Munukutla, Bangalore (IN); Suprojit Mukherjee, Kalyani (IN); Raghavendra Kencharla, Bangalore (IN); Ayush Sood, Benaluru (IN)

(73) Assignee: Cypress Semiconductor Corporation, San Jose, CA (US)

( * ) Notice: Subject to any disclaimer, the term of this patent is extended or adjusted under 35 U.S.C. 154(b) by 316 days.

(21) Appl. No.: 18/335,581

(22) Filed: Jun. 15, 2023

(65) Prior Publication Data

US 2024/0422768 A1 Dec. 19, 2024

(51) Int. Cl.

| | |
|---|---|
| ***H04W 72/12*** | (2023.01) |
| ***H04W 72/1263*** | (2023.01) |
| ***H04W 84/12*** | (2009.01) |
| ***H04W 88/06*** | (2009.01) |
| ***H04W 92/02*** | (2009.01) |

(52) U.S. Cl.

CPC ... *H04W 72/1215* (2013.01); *H04W 72/1263* (2013.01); *H04W 84/12* (2013.01); *H04W 88/06* (2013.01); *H04W 92/02* (2013.01)

(58) Field of Classification Search

CPC .......................................... H04W 72/12–1273

See application file for complete search history.

(56) References Cited

U.S. PATENT DOCUMENTS

| | | | | |
|---|---|---|---|---|
| 2009/0180451 | A1 * | 7/2009 | Alpert | H04W 72/1215 |
| 2011/0194506 | A1 * | 8/2011 | Hirsch | H04W 72/1215 |
| 2019/0223193 | A1 * | 7/2019 | Su | H04W 72/1215 |
| 2019/0239140 | A1 * | 8/2019 | Arickan | H04W 72/1215 |

FOREIGN PATENT DOCUMENTS

| | | | | |
|---|---|---|---|---|
| WO | WO-2004045082 A2 * | 5/2004 | | H04W 72/1215 |

* cited by examiner

*Primary Examiner* — Timothy J Weidner

(57) ABSTRACT

Systems, methods, and devices provide coexistence between collocated transceivers in wireless devices. Methods include receiving, at a scheduler, scheduling information identifying activity of a first transceiver during a designated period of time, and identifying, using a scheduler associated with a second transceiver, activity of the second transceiver during the designated period of time, the second transceiver being collocated with the first transceiver in a wireless device. Methods also include scheduling, using the scheduler, activity of the second transceiver based on an overlap of transmit activity of the first transceiver with transmit activity of the second transceiver.

20 Claims, 8 Drawing Sheets

700

SYSTEMS, METHODS, AND DEVICES FOR WIRELESS DEVICE COEXISTENCE ENHANCEMENT USING ACTIVITY OVERLAP

TECHNICAL FIELD

This disclosure relates to data transmission using wireless devices, and more specifically, to enhancement of coexistence of transceivers in such wireless devices.

BACKGROUND

Wireless devices may communicate with each other via one or more wireless modalities, such as a WLAN connection or a Bluetooth connection. Accordingly, such wireless communication may be implemented in a manner compliant with a wireless protocol. Moreover, such wireless devices may include various hardware components to facilitate such communication. For example, wireless devices may include transmission media that may include one or more transceivers and antennas. Conventional techniques for handling activity of collocated transceivers remain limited because they are not able to efficiently facilitate sharing of a communications medium while ensuring both transceivers have sufficient medium access.

DETAILED DESCRIPTION

In the following description, numerous specific details are set forth in order to provide a thorough understanding of the presented concepts. The presented concepts may be practiced without some or all of these specific details. In other instances, well known process operations have not been described in detail so as not to unnecessarily obscure the described concepts. While some concepts will be described in conjunction with the specific examples, it will be understood that these examples are not intended to be limiting.

Wireless devices may include collocated transceivers configured to communicate using one or more wireless transmissions protocols. For example, a first transceiver may be a Bluetooth or Bluetooth Low Energy (BLE) transceiver, and a second transceiver may be a WLAN transceiver that may be configured to communicate using a transmission protocol such as a Wi-Fi protocol. In various embodiments, the first transceiver may be performing transmit operations that are demanding and require frequent medium accesses. For example, the first transceiver may be transmitting audio data, and may have relatively frequent medium accesses. In one specific example, the first transceiver may be a BLE transceiver and implemented in a low power device and may be performing Auracast. When implemented in this way, the wireless device may utilize time division multiple access (TDMA) communications medium access techniques, and the windows available to the second transceiver may be very narrow. Accordingly, in such an example, the second transceiver may have difficulty scheduling a time at which it may access the medium, and it may have to wait long periods of time.

Embodiments disclosed herein provide the ability to improve medium access of collocated transceivers by selectively allowing overlapping transmit activity. As will be discussed in greater detail below, a scheduler may be configured to schedule activity of a first transceiver and a second transceiver such that transmit operations overlap without causing unacceptable interference. Moreover, the scheduler may also ensure that receive operations of the second transceiver are protected, such as a receive period associated with acknowledgement signals. By dynamically scheduling activity in this way, a transmit period of the second transceiver may be elongated, and the second transceiver may be provided with significantly more medium access, and collocation of the transceivers is improved.

Figure 1:
FIG. 1 illustrates an example of a system for coexistence enhancement, configured in accordance with some embodiments.
Figure 1:
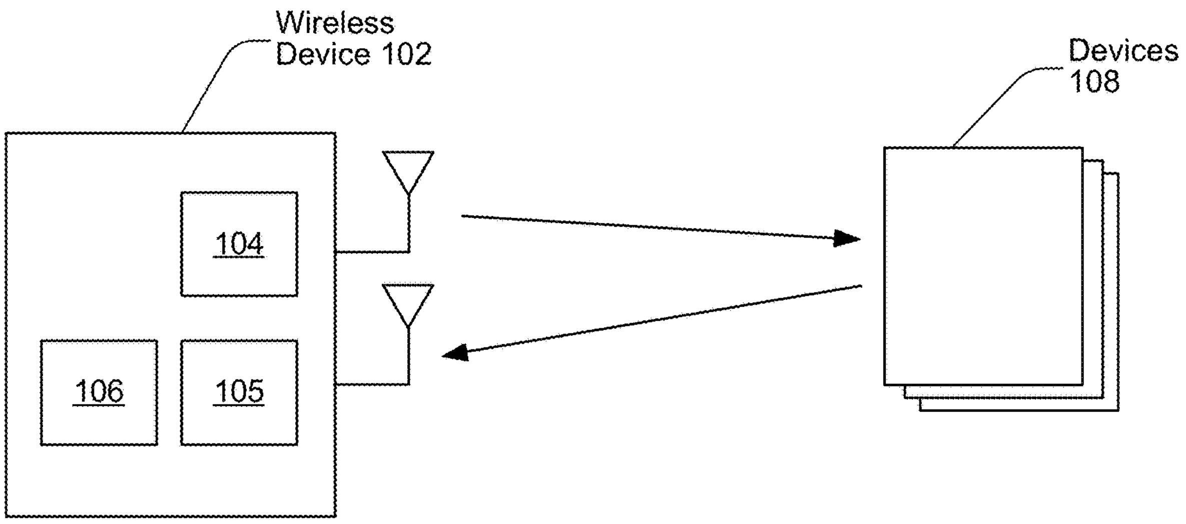

FIG. 1 illustrates an example of a system for coexistence enhancement, configured in accordance with some embodiments. Accordingly, a system, such as system 100, may include wireless devices that are used for wireless communications, and are also configured to be able to perform coexistence and scheduling operations as disclosed herein. Accordingly, as will be discussed in greater detail below, wireless devices included in system 100 may be configured to dynamically schedule activity of collocated transceivers to intelligently enable overlapping of activity and increase an available window for one or more of the collocated transceivers.

In various embodiments, system 100 may include wireless device 102 which may be a wireless communications device. As discussed above, such wireless devices may be compatible with one or more wireless transmission protocols, such as a Wi-Fi protocol or a Bluetooth protocol. In some embodiments, wireless device 102 includes collocated radios. For example, wireless device 102 may include a WLAN radio and a Bluetooth radio that share access to a communications medium. For example, wireless device 102 may include a first transceiver, such as transceiver 104, and a second transceiver, such as transceiver 105. Transceiver 104 may be a WLAN transceiver compatible with a Wi-Fi specification and protocol, and transceiver 105 may be compatible with a Bluetooth specification and protocol. For example, the Bluetooth protocol may be a Bluetooth Low Energy (BLE) protocol, also referred to as Bluetooth Smart.

In some embodiments, wireless device 102 may be an audio streaming device configured to support one or more audio streaming services and capabilities. For example, transceiver 105 may be a BLE transceiver configured to support Bluetooth Auracast. Wireless device 102 may also be a smart device, such as those found in wearable devices, or may be a monitoring device, such as those found in smart buildings, environmental monitoring, and energy management. It will be appreciated that such wireless devices may be any suitable device, such as those found in cars, other vehicles, and even medical implants.

As shown in FIG. 1, various wireless communications devices may be in communication with each other via one or more wireless communications mediums. Moreover, wireless device 102 may each include one or more antennas, and may also include processing device 106. As discussed above, wireless device 102 may also include collocated transceivers, such as transceiver 104 and transceiver 105. As disclosed herein a transceiver as well as its associated transmit and receive chains and processing logic may be referred to as a radio. As will be discussed in greater detail below, such processing devices, transceivers, and radios may be configured to establish communications connections with other devices and transmit data in the form of data packets via such communications connections. Accordingly, wireless devices, such as wireless device 102, are configured to schedule activity of collocated transceivers, such as transceiver 104 and transceiver 105, such that selective overlapping of transmit activity is permissible.

In some embodiments, system 100 may further include devices 108 which may also be wireless devices. As similarly discussed above, devices 108 may be compatible with one or more wireless transmission protocols, such as a Wi-Fi protocol or a Bluetooth protocol. In some embodiments, devices 108 may be configured as stations in communication with wireless device 102. For example, devices 108 may be smart devices or other devices, such as audio devices, gaming systems, cars, other vehicles, and medical implants. In various embodiments, devices 108 may be different types of devices than wireless device 102. As discussed above, each of devices 108 may include one or more antennas, as well as processing devices and transceivers, which may also be configured to establish communications connections with other devices, and transmit data in the form of data packets via such communications connections. As discussed above, devices 108 may also be configured to schedule activity of collocated transceivers such that selective overlapping of transmit activity is permissible.

Figure 2:
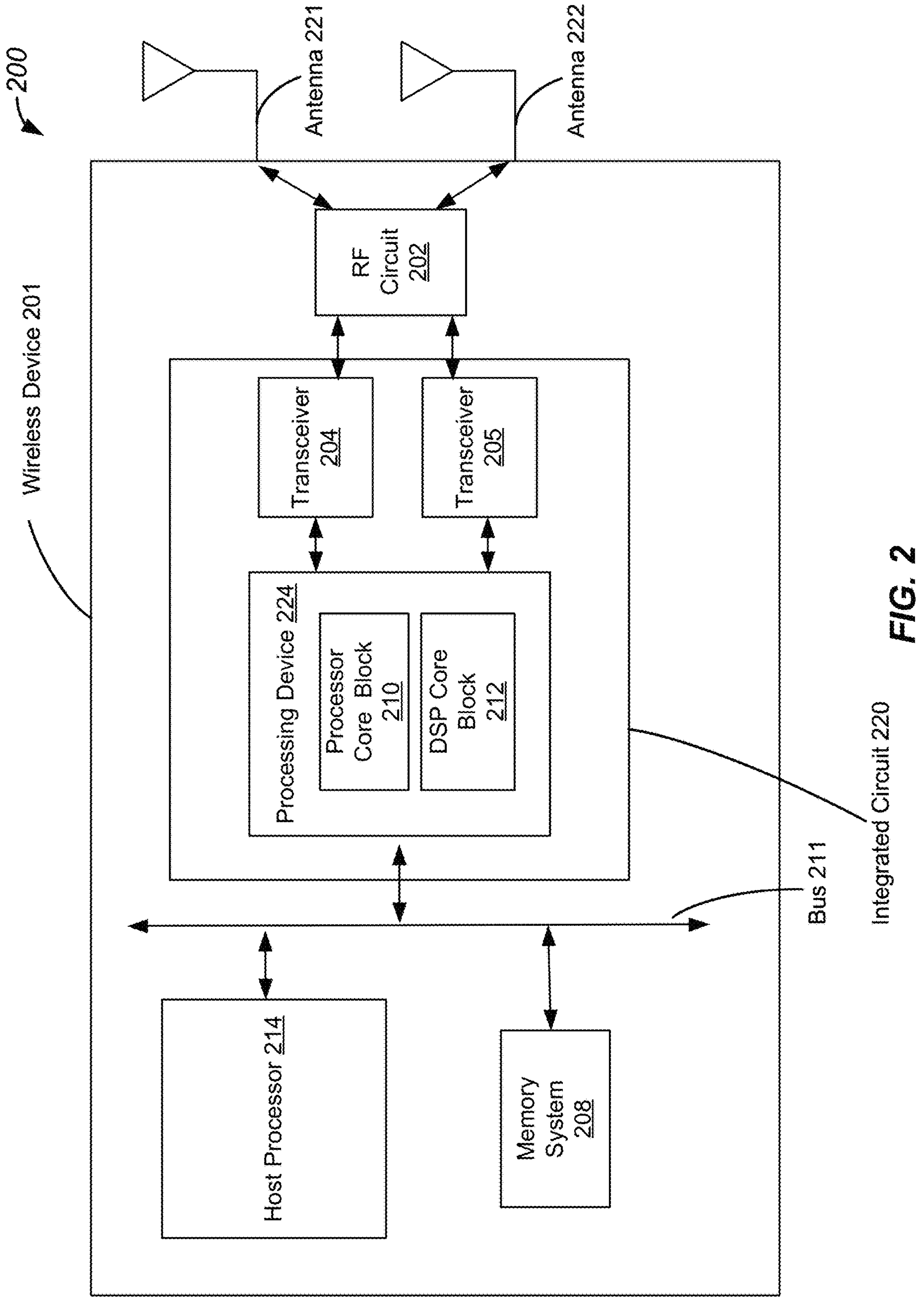
FIG. 2 illustrates an example of a device for coexistence enhancement, configured in accordance with some embodiments.

FIG. 2 illustrates an example of a device for coexistence enhancement, configured in accordance with some embodiments. More specifically, FIG. 2 illustrates an example of a system, such as system 200, that includes wireless device 201. It will be appreciated that wireless device 201 may be one of any of the wireless devices discussed above with reference to FIG. 1, such as wireless device 102 and devices 108.

In various embodiments, wireless device 201 includes one or more transceivers, such as transceiver 204 and transceiver 205. In one example, system 200 includes transceiver 204 which is configured to transmit and receive signals using a communications medium that may include antenna 221 or antenna 222. As noted above, transceiver 204 may be a WLAN transceiver. Accordingly, transceiver 204 may be compatible with a Wi-Fi communications protocol, such as an 802.11ax protocol. In various embodiments, transceiver 204 includes a modulator and demodulator as well as one or more buffers and filters, that are configured to generate and receive signals via antenna 221 and/or antenna 222.

System 200 additionally includes transceiver 205 which may be collocated with transceiver 204 in wireless device 201. In various embodiments, transceiver 205 is also be configured to transmit and receive signals using a communications medium that may include antenna 221 or antenna 222. Accordingly, transceiver 205 may be a Bluetooth transceiver compatible with a Bluetooth communications protocol. In one example, the Bluetooth protocol may be a Bluetooth Low Energy (BLE) protocol. Moreover, transceiver 205 includes a modulator and demodulator as well as one or more buffers and filters, that are configured to generate and receive signals via antenna 221 and/or antenna 222. While various embodiments are described with reference to Bluetooth and Wi-Fi communications protocols, it will be appreciated that any suitable protocol may be used.

In various embodiments, system 200 further includes processing device 224 which may include logic implemented using processing elements and/or one or more processor cores. Accordingly, processing device 224 is configured to perform coexistence and scheduling operations, as will be discussed in greater detail below. More specifically, processing elements included in processing device 224 may be configured to implement a packet traffic arbiter and a scheduler that may be configured to perform coexistence and scheduling operations as disclosed herein. In some embodiments, the packet traffic arbiter and scheduler may be implemented in firmware included in processing device 224.

Moreover, processing device 224 includes one or more components configured to implement a medium access control (MAC) layer that is configured to control hardware associated with a wireless transmission medium, such as that associated with a WLAN transmission medium. In one example, processing device 224 may include processor core block 210 that may be configured to implement a driver, such as a Bluetooth and/or Wi-Fi driver. Processing device 224 may further include digital signal processor (DSP) core block 212 which may be configured to include microcode.

In various embodiments, processor core block 210 comprises multiple processor cores which are each configured to implement specific portions of a wireless protocol interface. For example, a Bluetooth protocol may be implemented using a Bluetooth stack in which software is implemented as a stack of layers, and such layers are configured to compartmentalize specific functions utilized to implement the Bluetooth communications protocol. In various embodiments, a stack includes layers for a Bluetooth network encapsulation protocol, radio frequency communication, service discovery protocol, as well as various other high level data layers. Moreover, a stack also includes a link management protocol, a host controller interface, a link layer which may be a low energy link layer, as well as various other timing layers.

System 200 further includes radio frequency (RF) circuit 202 which is coupled to antenna 221 and antenna 222. In various embodiments, RF circuit 202 may include various components such as an RF switch, a diplexer, and a filter. While FIG. 2 illustrates system 200 as having two antennas, it will be appreciated that system 200 may have a single antenna, or any suitable number of antennas. Accordingly, RF circuit 202 may be configured to select an antenna for transmission/reception, and may be configured to provide coupling between the selected antenna, such as antenna 221, and other components of system 200 via a bus, such as bus 211. While one RF circuit is shown, it will be appreciated that wireless device 201 may include multiple RF circuits. Accordingly, each of multiple antennas may have its own RF circuit. Moreover, each one may be associated with a particular wireless communications protocol, such as a first antenna and RF circuit for Wi-Fi and a second antenna and RF circuit for Bluetooth.

System 200 includes memory system 208 which is configured to store one or more data values associated with coexistence and scheduling operations discussed above and in greater detail below. Accordingly, memory system 208 includes storage device, which may be a non-volatile random access memory (NVRAM) configured to store such data values, and may also include a cache that is configured to provide a local cache. In various embodiments, system 200 further includes host processor 214 which is configured to implement processing operations implemented by system 200.

It will be appreciated that one or more of the above-described components may be implemented on a single chip, or on different chips. For example, transceiver 204, transceiver 205, and processing device 224 may be implemented on the same integrated circuit chip, such as integrated circuit chip 220. In another example, transceiver 204, transceiver 205, and processing device 224 may each be implemented on their own chip, and thus may be disposed separately as a multi-chip module or on a common substrate such as a printed circuit board (PCB). It will also be appreciated that components of system 200 may be implemented in the context of a low energy device, a smart device, or a vehicle such as an automobile. Accordingly, some components, such as integrated chip 220, may be implemented in a first location, while other components, such as antenna 221, may be implemented in second location, and coupling between the two may be implemented via a coupler such as RF circuit 202.

Figure 3:
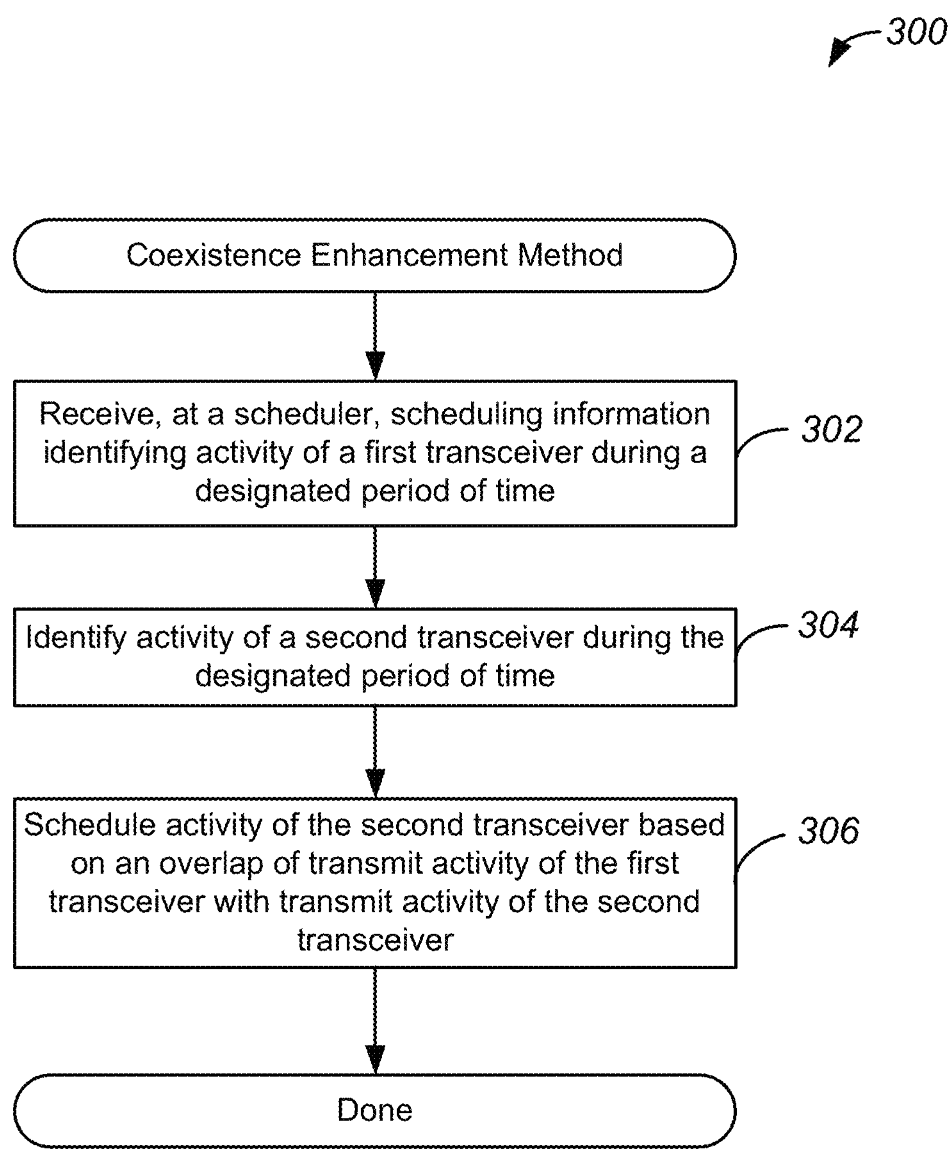
FIG. 3 illustrates an example of a method for coexistence enhancement, performed in accordance with some embodiments.

FIG. 3 illustrates an example of a method for coexistence enhancement, performed in accordance with some embodiments. As will be discussed in greater detail below, a method, such as method 300, may be performed to enable improved efficiency of usage of communications mediums by collocated transceivers by enabling activity overlap between the two transceivers. More specifically, overlapping transmit activity may be selectively implemented to increase a medium availability of one of the collocated transceivers.

Method 300 may perform operation 302 during which scheduling information may be received at a scheduler. In various embodiments, the scheduling information identifies activity of a first transceiver during a designated period of time. Accordingly, a scheduler may receive scheduling information that indicates that communications medium activity associated with a first transceiver is imminent.

Method 300 may perform operation 304 during which activity of a second transceiver during the designated period of time may be identified. Accordingly, additional scheduling information associated with the second transceiver may be received and/or retrieved, and communications medium activity associated with the second transceiver may be identified.

Method 300 may perform operation 306 during which activity of the second transceiver is scheduled based on an overlap of transmit activity of the first transceiver with transmit activity of the second transceiver. As will be discussed in greater detail below, transmit activity of the second transceiver may be scheduled such that a termination of the transmit activity of the second transceiver coincides with a termination of the transmit activity of the first transceiver. Accordingly, transmit activity of the first transceiver and the second transceiver may overlap and terminate at approximately the same time. As will be discussed in greater detail below, the scheduler may also ensure that a subsequent acknowledgment block associated with the second transceiver does not overlap with any activity of the first transceiver. It will be appreciated that, as disclosed herein, coinciding terminations may not require exact coincidence, but may be relatively close in time.

Figure 4:
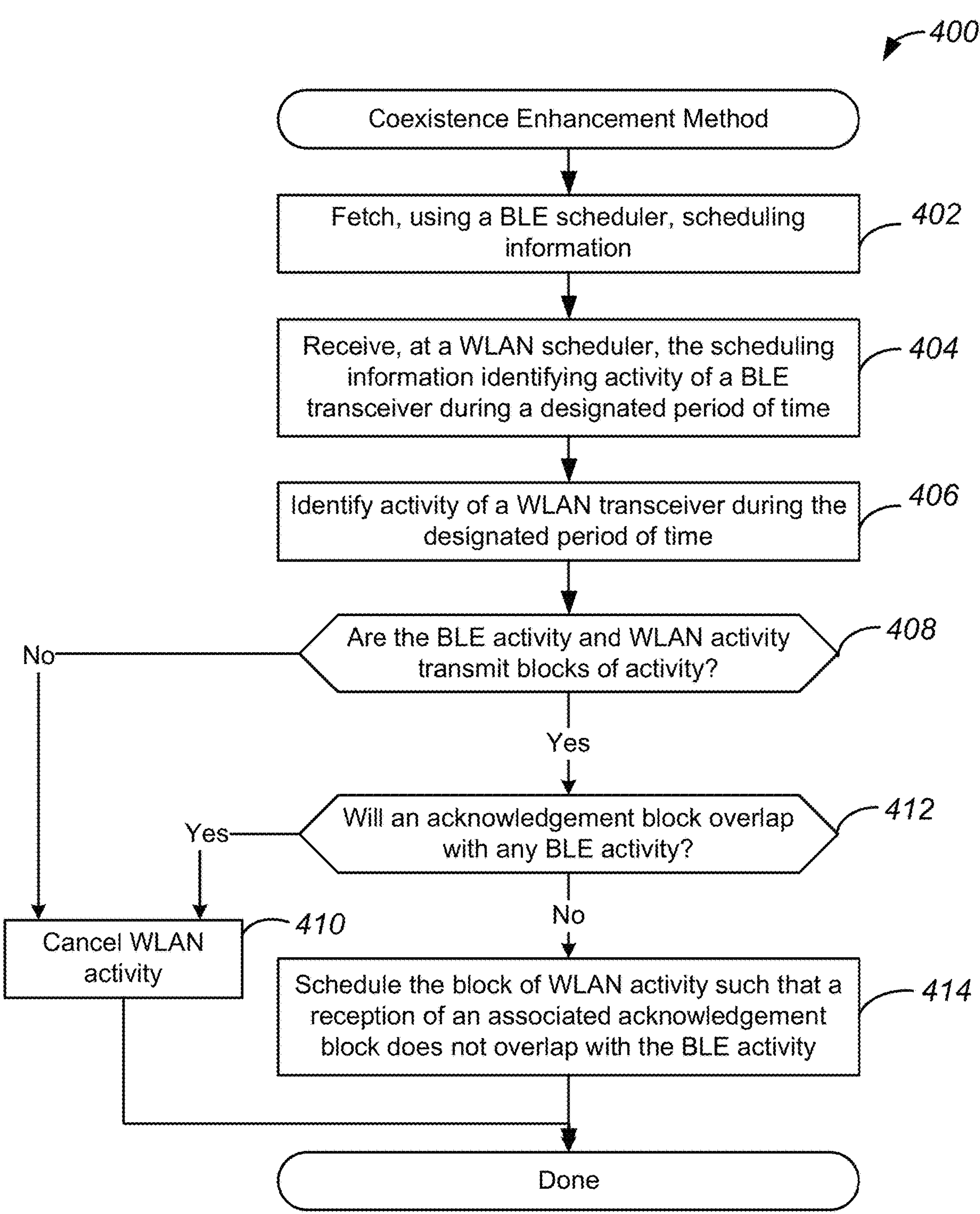
FIG. 4 illustrates another example of a method for coexistence enhancement, performed in accordance with some embodiments.

FIG. 4 illustrates another example of a method for coexistence enhancement, performed in accordance with some embodiments. As similarly discussed above, a method, such as method 400, may be performed to enable improved efficiency of usage of communications mediums by collocated transceivers by enabling activity overlap between the two transceivers. As will be discussed in greater detail below, one or more schedulers are used to manage scheduling information for each of the collocated transceivers, and selectively allow overlapping of transmit activity to increase a medium availability to one or more of the collocated transceivers.

Method 400 may perform operation 402 during which scheduling information may be fetched using a BLE scheduler. In various embodiments, the scheduling information identifies activity of a BLE transceiver during a designated period of time. As discussed above, the activity may be audio streaming activity, as may occur during the implementation of Auracast operations. Accordingly, such activity has a duration and periodicity specified in a schedule, and such a schedule is managed by a scheduler of the BLE transceiver. Thus, during operation 402, the BLE scheduler generates scheduling information for an upcoming period of activity for the BLE transceiver, and the scheduling information identifies various blocks of activity, such as transmit and receive periods for the BLE transceiver.

Method 400 may perform operation 404 during which the scheduling information is received at a WLAN scheduler. Accordingly, the scheduling information is provided from the BLE scheduler to a WLAN scheduler via a communications interface between the two collocated transceivers. As discussed above, the scheduling information identifies activity of a BLE transceiver during the designated period of time. Accordingly, the WLAN scheduler receives scheduling information identifying activity of the BLE transceiver, and also indicating that communications medium activity associated with BLE transceiver is imminent.

In some embodiments, the identification of imminent BLE activity is identified based on one or more other data values and/or signals. For example, if BLE transmit activity is preceded by BLE receive activity, a bus bit is toggled when the BLE transceiver transitions from BLE receive to BLE transmit. Accordingly, in some embodiments, the WLAN scheduler is configured to detect and identify the toggling of the bus bit as an indication of imminent BLE transmit activity.

Method 400 may perform operation 406 during which activity of the WLAN transceiver during the designated period of time is identified. Accordingly, the WLAN scheduler retrieves additional scheduling information associated with the WLAN transceiver, and communications medium activity associated with the WLAN transceiver is identified.

Method 400 may perform operation 408 during which it may be determined if there are transmit operations included in the identified BLE activity and WLAN activity. Such a determination is made based on an analysis of the scheduling information performed by the WLAN scheduler. More specifically, the WLAN scheduler looks at each of the identified blocks of activity to determine if any transmit operations are identified. If it is determined that no transmit operations identified, method 400 may proceed to operation 410 during which activity of the WLAN transceiver may be canceled to allow for receive and/or transmit operations of the BLE transceiver. In various embodiments, the WLAN transceiver also transmits a protection frame for a known duration of activity of the BLE transceiver. The protection frame may be sent after an RF active signal is asserted and detected by the WLAN transceiver, but prior to the commencement of the BLE activity. In some embodiments, instead of canceling the WLAN activity, the WLAN activity is modified based on the identified conflict. For example, the WLAN activity may not be canceled, but instead rescheduled to avoid the identified conflict by scheduling the WLAN activity around the identified BLE activity. If it is determined that transmit operations are identified, method 400 may proceed to operation 412.

Accordingly, during operation 412, it is determined if an acknowledgement block will overlap with any BLE activity. Accordingly, the WLAN scheduler identifies a timing and duration of an acknowledgement block in which the WLAN transceiver listens for an acknowledgement signal from another wireless device. Such an acknowledgement block follows the WLAN transmit block in accordance with the WLAN protocol. Accordingly, the WLAN scheduler determines if any identified BLE activity occurs during the period of time allocated to the acknowledgement block. If any BLE activity is identified during this period of time, method 400 may proceed to operation 410 where the WLAN activity is canceled or rescheduled. If no BLE activity is identified during this period of time, method 400 proceeds to operation 414.

Accordingly, during operation 414, the block of WLAN activity is scheduled such that reception of an associated acknowledgement block does not overlap with the BLE activity. More specifically, the WLAN activity may be scheduled such that a termination of the WLAN transmit block coincides with a termination of the BLE transmit block. As similarly discussed above, transmit activity of the WLAN transceiver is scheduled such that termination of the WLAN transmit activity coincides with a termination of the BLE transmit activity. Thus, the WLAN scheduler aligns termination times of the BLE and WLAN transmit blocks and generates a WLAN schedule based, at least in part, on this alignment. In various embodiments, the WLAN scheduler is configured to introduce a temporal offset. Accordingly, the alignment of termination points may include an offset such that termination of the WLAN transmit block occurs at the time of termination of the BLE transmit block plus the offset. Additional details regarding such alignment are discussed in greater detail below with respect to FIGS. 6-8.

As will also be discussed in greater detail below, in some embodiments, the scheduling of the WLAN transmit block also includes the scheduling of a protection frame. For example, the WLAN scheduler schedules a clear-to-send (CTS) frame coinciding with a beginning of the BLE transmit period to reduce unnecessary WLAN transmit time and reduce overall power consumption. In some embodiments, one or more other operations are performed in addition to or instead of the use of a protection frame. For example, the WLAN scheduler is configured to apply a scaling factor to the WLAN activity. Accordingly, the WLAN scheduler may scale down a rate associated with the WLAN activity to better match the duration of the BLE transmit activity.

Figure 5:
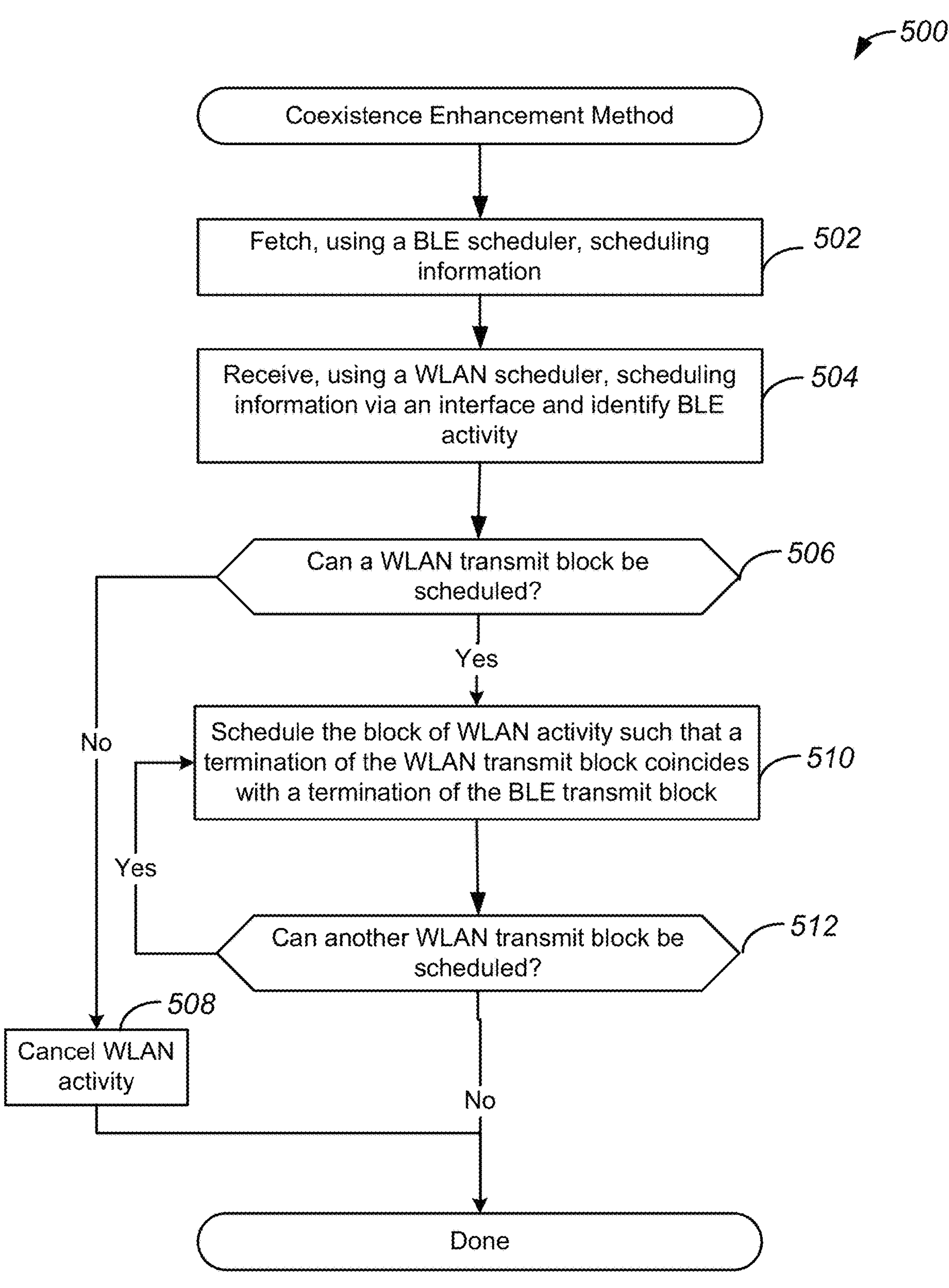
FIG. 5 illustrates an additional example of a method for coexistence enhancement, performed in accordance with some embodiments.

FIG. 5 illustrates an additional example of a method for coexistence enhancement, performed in accordance with some embodiments. As similarly discussed above, a method, such as method 500, may be performed to enable improved efficiency of usage of communications mediums by collocated transceivers by enabling activity overlap between the two transceivers. As will be discussed in greater detail below, one or more schedulers are configured to determine if multiple transmit periods may be stitched together to further improve efficiency of medium usage and availability.

Method 500 may perform operation 502 during which scheduling information may be fetched using a BLE scheduler. As similarly discussed above, the scheduling information identifies activity of a BLE transceiver during a designated period of time, where such activity has a duration and periodicity specified in a schedule, and such a schedule is managed by a scheduler of the BLE transceiver. Thus, during operation 502, the BLE scheduler generates scheduling information for an upcoming period of activity for the BLE transceiver, and the scheduling information identifies various blocks of activity, such as transmit and receive periods for the BLE transceiver.

Method 500 may perform operation 504 during which the scheduling information is received at a WLAN scheduler. As similarly discussed above, the scheduling information is provided from the BLE scheduler to a WLAN scheduler via a communications interface between the two collocated transceivers. As discussed above, the scheduling information identifies activity of a BLE transceiver during the designated period of time. Accordingly, the WLAN scheduler receives scheduling information identifying activity of the BLE transceiver, and also indicating that communications medium activity associated with BLE transceiver is imminent.

Method 500 may perform operation 506 during which it is determined if a WLAN transmit block can be scheduled. As similarly discussed above, such a determination may be made based on an identification of transmit activity for both the BLE transceiver and WLAN transceiver, based on an identification of the WLAN transmit block being shorter than the BLE transmit block, and based on an acknowledgement block of the WLAN transceiver not conflicting with BLE activity. If it is determined that a WLAN transmit block can't be scheduled, method 500 proceeds to operation 508 where the WLAN activity is canceled. If it is determined that the WLAN transmit block can be scheduled, method 500 proceeds to operation 510.

Accordingly, during operation 510, the block of WLAN activity is scheduled such that a termination of the WLAN transmit block coincides with a termination of the BLE transmit block. As similarly discussed above, the WLAN scheduler aligns termination times of the BLE and WLAN transmit blocks and generates a WLAN schedule based, at least in part, on this alignment. As also discussed above, the WLAN scheduler may introduce a temporal offset, and may also use one or more protection frames. Accordingly, the scheduling of the WLAN activity may also include the scheduling of one or more clear-to-send (CTS) frames.

Method 500 may perform operation 512 during which it may be determined if another WLAN transmit block can be scheduled. Such a determination may be made based on a duration of a subsequent WLAN transmit block and a start time of a subsequent BLE transmit block. Thus, the WLAN scheduler determines if there is enough time between a termination of a first acknowledgement block and a beginning of a subsequent BLE transmit block to accommodate a subsequent WLAN transmit block and its associated acknowledgement block. Additional details regarding such a determination are discussed in greater detail below with reference to FIG. 6. If it is determined that another WLAN transmit block may be scheduled, method 500 may return to operation 510. If it is determined that another WLAN activity cannot be scheduled, method 500 may terminate.

Figure 6:
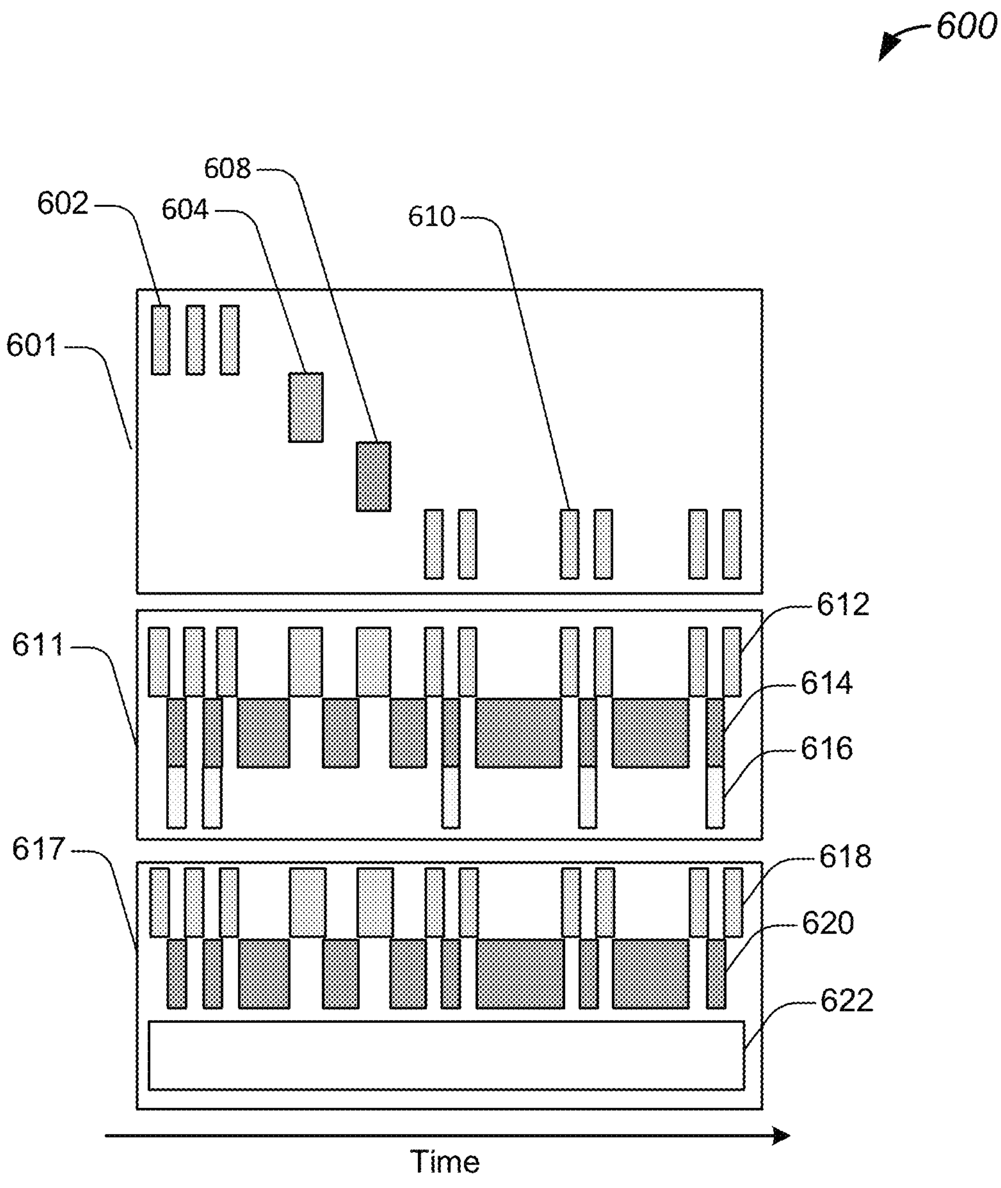
FIG. 6 illustrates an example of timing diagram of coexistence techniques, performed in accordance with some embodiments.

FIG. 6 illustrates an example of timing diagram of coexistence techniques, performed in accordance with some embodiments. As similarly discussed above, medium usage efficiency of collocated transceivers may be improved by enabling activity overlap between the transceivers. As also discussed above, one or more schedulers are used to manage scheduling information for each of the collocated transceivers, and selectively allow overlapping of transmit activity to increase a medium availability to one or more of the collocated transceivers. Accordingly, diagram 600 illustrates several timing diagrams, such as timing diagram 601, timing diagram 611, and timing diagram 617, that illustrate various implementations of activity associated with collocated transceivers.

More specifically, timing diagram 601 illustrates activity blocks associated with a first transceiver. According to some embodiments, the first transceiver is a Bluetooth transceiver. The Bluetooth transceiver may be a BLE transceiver, and may have various operations and activity blocks for advertisement 602, secondary advertisement 604, periodic advertisement 608 and broadcast operations, such as broadcast 610. As shown in timing diagram 611, such activity blocks can correspond to a Bluetooth RF active signal shown by BT RF active blocks 612. The times when the Bluetooth RF active signal is not asserted may be available to the second transceiver for transmit and receive operations. In some embodiments, the second transceiver is a WLAN transceiver. Such available times are shown by opportunity blocks 614. Moreover, blocks 616 illustrate time where the communications medium is not used because the available window of time is too narrow for the second transceiver. Accordingly, blocks 616 represent unused opportunities of the communications medium.

Timing diagram 617 again illustrates BT RF active blocks 612 and opportunity blocks 620. In this example, where selective overlap of transmit activity is enabled, opportunity blocks 620 represent opportunities for receive operations. Opportunity block 622 illustrates the available time for transmit operations for the second transceiver. As shown in timing diagram 617, the opportunity for transmit operations has been expanded, and there are no periods of unused opportunities on the communications medium.

Figure 7:
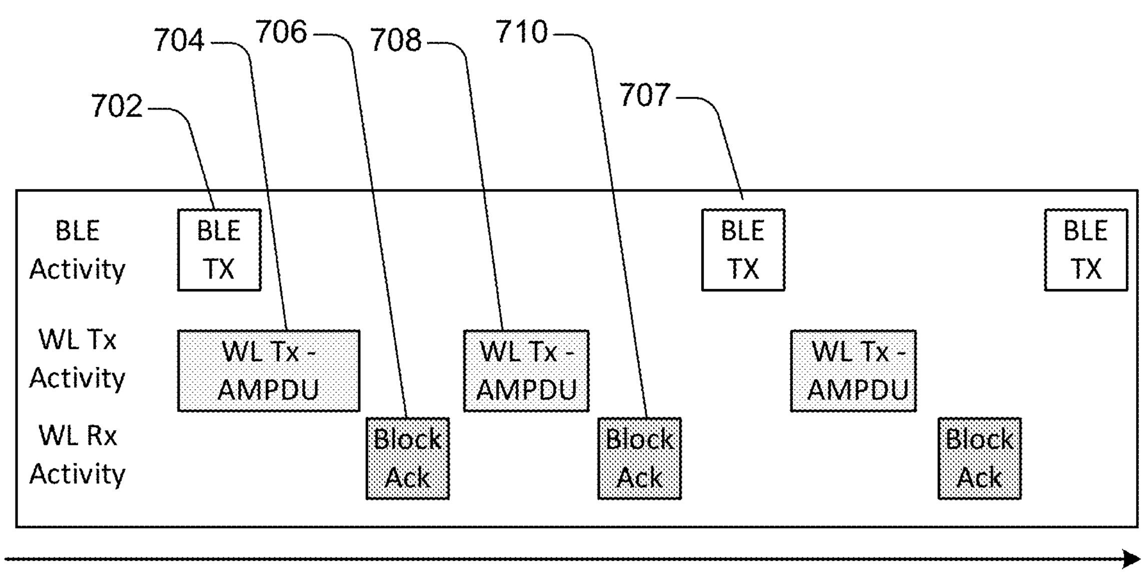
FIG. 7 illustrates another example of timing diagram of coexistence techniques, performed in accordance with some embodiments.

FIG. 7 illustrates another example of timing diagram of coexistence techniques, performed in accordance with some embodiments. As similarly discussed above, medium usage efficiency of collocated transceivers may be improved by enabling activity overlap between the transceivers. As shown in diagram 700, multiple transmit operations of a second transceiver may be stitched and performed sequentially if permitted by activity of a first transceiver. More specifically, transmit activity of a first transceiver, such as a Bluetooth transceiver, is shown by blocks, such as block 702. Moreover, transmit operations and corresponding acknowledgement receive operations are shown by block 704 and block 706, respectively. As shown in diagram 700, transmit operations associated with block 702 and block 704 overlap, while block 706 does not overlap with any other blocks and is clear to receive. Moreover, a scheduler has determined that sufficient time between transmit blocks 702 and 707, and has scheduled an additional transmit block and acknowledgement receive block shown by block 708 and block 710, respectively.

Figure 8:
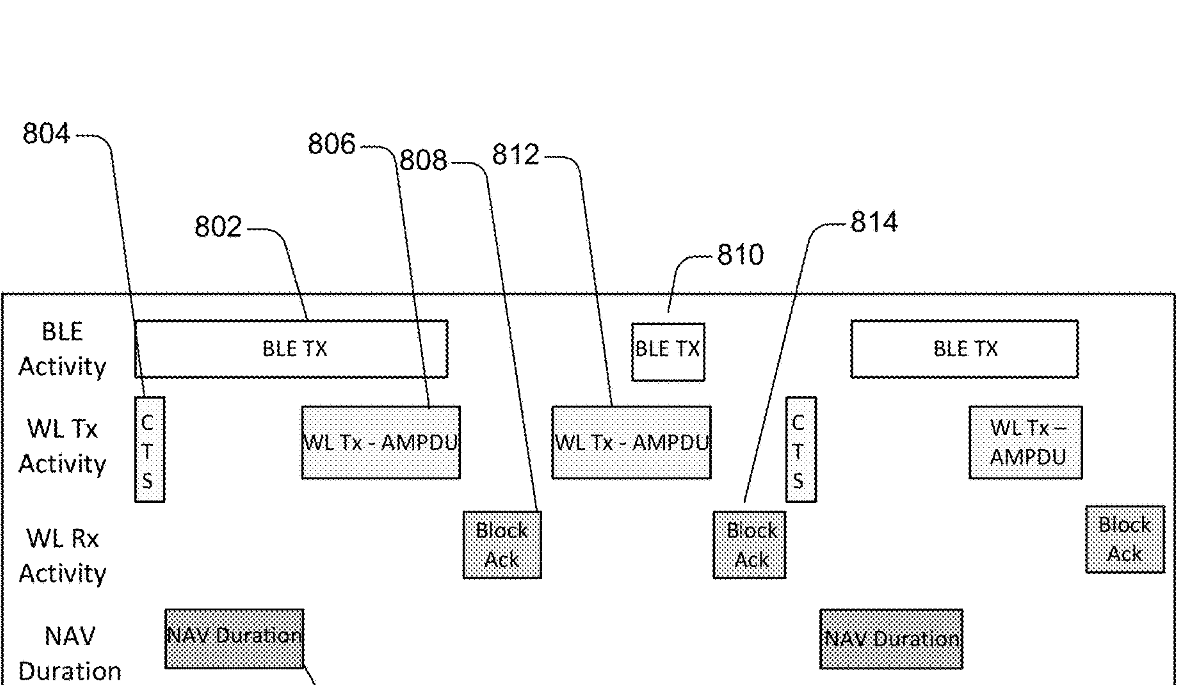
FIG. 8 illustrates an additional example of timing diagram of coexistence techniques, performed in accordance with some embodiments.

FIG. 8 illustrates an additional example of timing diagram of coexistence techniques, performed in accordance with some embodiments. As similarly discussed above, medium usage efficiency of collocated transceivers may be improved by enabling activity overlap between the transceivers. As shown in diagram 800, protection frames, such as protection frame 804, are used to facilitate alignment of transmit operations and improve overall efficiency of a wireless device. As similarly discussed above, diagram 800 shows transmit operations of a first transceiver and a second transceiver which are represented by block 802 and block 806, respectively. In various embodiments, protection frame 804 is used to facilitate alignment of termination points of block 802 and block 806 when a transmit period represented by block 802 is relatively long compared to the transmit period represented by block 806. More specifically, a WLAN transceiver may identify a duration of activity of a BLE transceiver based on an RF active signal. The WLAN transceiver may also identify a duration of a WLAN transmit operation for a data packet. The WLAN transceiver may then schedule a protection frame such that the protection frame duration plus the WLAN transmit activity equals the identified duration of the BLE activity. In this way, the protection frame may be configured and scheduled. An acknowledge receive block is represented by block 808. Protection frame 804 may also have an associated NAV duration block 805.

Diagram 800 further illustrates additional transmit operations shown by block 810 and block 812, which has a corresponding acknowledge receive block is represented by block 814. As shown in diagram 800, because block 810 is short relative to block 812, no protection frame is used to align termination of block 810 and block 812. In this way, the use of protection frames may be implemented selectively and dynamically based on one or more transmit parameters associated with transmit operations of the first transceiver and the second transceiver. As discussed above, the protection frames may be CTS frames, but any suitable data frame may be used.

Although the foregoing concepts have been described in some detail for purposes of clarity of understanding, it will be apparent that certain changes and modifications may be practiced within the scope of the appended claims. It should be noted that there are many alternative ways of implementing the processes, systems, and devices. Accordingly, the present examples are to be considered as illustrative and not restrictive.

What is claimed is:

1. A method comprising:

receiving, at a first scheduler associated with a first transceiver, scheduling information identifying activity of the first transceiver during a designated period of time;

identifying, using a second scheduler associated with a second transceiver, activity of the second transceiver during the designated period of time, the second transceiver being collocated with the first transceiver in a wireless device;

determining, using the second scheduler, additional scheduling information based on imminent communications medium activity of the first transceiver identified based, at least in part, on one or more data values received via a communications bus coupled to the collocated first transceiver and second transceiver; and scheduling, using the second scheduler, activity of the second transceiver based on the additional scheduling information such that transmit activity of the second transceiver is permitted to overlap transmit activity of the first transceiver and an acknowledgement receive block of the second transceiver does not overlap transmit activity of the first transceiver.

2. The method of claim 1, wherein the transmit activity of the second transceiver is scheduled to terminate at a time that coincides with a termination of the transmit activity of the first transceiver.

3. The method of claim 1 further comprising:

determining the acknowledgement receive block can be scheduled after the transmit activity of the second transceiver; and scheduling the acknowledgement receive block.

4. The method of claim 2 further comprising:

determining a protection frame should be used for the scheduling of the activity of the second transceiver.

5. The method of claim 4 further comprising:

scheduling the protection frame for the second transceiver at a beginning of the transmit activity of the first transceiver.

6. The method of claim 5, wherein the protection frame is a clear-to-send (CTS) frame.

7. The method of claim 1, wherein the transmit activity of the second transceiver is scheduled to terminate after a designated temporal offset from a termination of the transmit activity of the first transceiver.

8. The method of claim 1, wherein the first transceiver is a Bluetooth Low Energy (BLE) transceiver, and wherein the second transceiver is a WLAN transceiver.

9. The method of claim 8, wherein the transmit activity of the first transceiver comprises transmit operations for streaming audio data.

10. A system comprising:

a first transceiver;

a first scheduler associated with the first transceiver, the first scheduler being configured to generate scheduling information identifying activity of the first transceiver during a designated period of time;

a second transceiver;

a second scheduler associated with the second transceiver, the second scheduler being configured to:

receive the scheduling information from the first scheduler;

identify activity of the second transceiver during the designated period of time;

determine additional scheduling information based on imminent communications medium activity of the first transceiver identified based, at least in part, on one or more data values received via a communications bus coupled to the collocated first transceiver and second transceiver; and schedule activity of the second transceiver based on the additional scheduling information such that transmit activity of the second transceiver is permitted to overlap transmit activity of the first transceiver and an acknowledgement receive block of the second transceiver does not overlap transmit activity of the first transceiver.

11. The system of claim 10, wherein the transmit activity of the second transceiver is scheduled to terminate at a time that coincides with a termination of the transmit activity of the first transceiver.

12. The system of claim 10, wherein the second scheduler is further configured to:

determine the acknowledgement receive block can be scheduled after the transmit activity of the second transceiver; and schedule the acknowledgement receive block.

13. The system of claim 10, wherein the second scheduler is further configured to:

determine a protection frame should be used for the scheduling of the transmit activity of the second transceiver; and schedule the protection frame for the second transceiver at a beginning of the transmit activity of the first transceiver.

14. The system of claim 10, wherein the first transceiver is a BLE transceiver, and wherein the second transceiver is a WLAN transceiver.

15. The system of claim 10, wherein the transmit activity of the second transceiver is scheduled to terminate after a designated temporal offset from a termination of the transmit activity of the first transceiver.

16. A device comprising:

a first transceiver;

a second transceiver; and processing elements configured to:

receive scheduling information identifying activity of the first transceiver during a designated period of time;

identify activity of the second transceiver during the designated period of time;

determine additional scheduling information based on imminent communications medium activity of the first transceiver identified based, at least in part, on one or more data values received via a communications bus coupled to the collocated first transceiver and second transceiver; and schedule activity of the second transceiver based on the additional scheduling information such that transmit activity of the second transceiver is permitted to overlap transmit activity of the first transceiver and an acknowledgement receive block of the second transceiver does not overlap transmit activity of the first transceiver.

17. The device of claim 16, wherein the transmit activity of the second transceiver is scheduled to terminate at a time that coincides with a termination of the transmit activity of the first transceiver.

18. The device of claim 16, wherein the processing elements are further configured to:

determine the acknowledgement receive block can be scheduled after the transmit activity of the second transceiver; and schedule the acknowledgement receive block.

19. The device of claim 16, wherein the processing elements are further configured to:

determine a protection frame should be used for the scheduling of the transmit activity of the second transceiver; and schedule the protection frame for the second transceiver at a beginning of the transmit activity of the first transceiver.

20. The device of claim 16, wherein the first transceiver is a BLE transceiver, and wherein the second transceiver is a WLAN transceiver.

* * * * *